(12) United States Patent
Jeong et al.

(10) Patent No.: US 6,438,228 B1
(45) Date of Patent: Aug. 20, 2002

(54) HINGE DEVICE OF MOBILE TELEPHONE

(75) Inventors: Byeong-Ro Jeong; Yong-Jin Yi; Sung-Soo Go, all of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/210,150

(22) Filed: Dec. 11, 1998

(30) Foreign Application Priority Data

Dec. 11, 1997 (KR) ............................................. 97-67814
Dec. 11, 1997 (KR) ............................................. 97-67815

(51) Int. Cl.[7] ......................... H04M 1/00; H04M 9/00; H04B 1/38; H04B 1/03; E05C 17/64
(52) U.S. Cl. ................... 379/433.13; 455/569; 455/90; 361/814; 16/341
(58) Field of Search ................................ 379/433, 428, 379/419, 433.13; 455/575, 569, 90; 361/814; 16/341

(56) References Cited

U.S. PATENT DOCUMENTS

| | | | |
|---|---|---|---|
| 5,436,954 A | * 7/1995 | Nishiyama et al. | ......... 379/433 |
| 5,697,124 A | * 12/1997 | Jung | ........................... 379/428 |
| 5,987,122 A | * 11/1999 | Daffara et al. | ......... 379/433.13 |
| 6,088,240 A | * 7/2000 | Steinhoff et al. | ............ 361/814 |
| 6,104,916 A | * 8/2000 | Steinhoff et al. | ............. 455/90 |
| 6,115,620 A | * 9/2000 | Colonna et al. | ............ 455/569 |

\* cited by examiner

*Primary Examiner*—Ahmad F. Matar
*Assistant Examiner*—Thjuan P Knowlin
(74) *Attorney, Agent, or Firm*—Dilworth & Barrese, LLP

(57) ABSTRACT

A hinge device of a flip type mobile telephone including a body and a flip cover with a speaker mounted thereon. In the hinge device, a hinge assembly includes a spring connector pin; a hinge shaft having at least one open end, a pair of opposite protrusions, a pair of opposite indents, and a cylindrical inner wall into which the connector pin is pressed, the shaft being movable along a rotation axis; a hinge housing having at least one open end into which the hinge shaft is inserted; guide means for enabling the hinge shaft to move rectilinearly in the hinge housing; and securing means for preventing separation of the hinge shaft from the hinge housing. The hinge device further includes a coupling member having a pair of opposite protrusions and a pair of opposite indents, for keeping in sliding surface contact with the hinge shaft; and conducting means interposed between the hinge assembly and the coupling member, for electrically connecting the speaker to a printed circuit board housed within the body. In this manner, the hinge device can connect the speaker mounted on the flip cover to the body, thus contributing to miniaturization of the mobile telephone.

19 Claims, 21 Drawing Sheets

HINGE DEVICE OF MOBILE TELEPHONE

BACKGROUND OF THE INVENTION

1. Field of the Invention

The present invention relates to a hinge device of a flip type mobile telephone, and in particular, to a hinge device with conducting means for electrically connecting a speaker mounted on a flip cover to a body of the mobile telephone.

2. Description of the Related Art

A mobile telephone such as cellular phone, digital phone, CT-2 (second generation Cordless Telephone) and PCS (Personal Communications Service) phone, is divided into a bar type, a flip type and a folder type according to shapes. Though all the types of the mobile telephones are widely used at present, the flip type and folder type mobile telephones have a tendency to be more popular. The reason that the flip type mobile telephone is popularized is because a flip cover mounted on a telephone body protects the buttons and functions as a reflection plate against the voice that the user utters. In particular, the flip type and folder type mobile telephones are popularized, because they are advantageous to miniaturization. In the flip type and folder type mobile telephones, a distance between a speaker (or earpiece) and a microphone (or mouthpiece) should be about 14 cm, if possible.

The flip type mobile telephone includes a body, a flip cover and a hinge device for mechanically coupling the flip cover to the telephone body. Further, the hinge device provides a specific opening angle between the flip cover and the telephone body.

U.S. Pat. No. 5,697,124 issued to Jung, discloses a mobile telephone including a hinge device mounted on a lower end of the body, for providing the opening angle between the flip cover and the body. In the conventional structure, the flip cover is electrically disconnected from the body so that a speaker cannot be installed in the flip cover. That is, the flip cover simply protects the buttons on the body and functions as a reflection plate for concentrating a user's voice to the microphone. Further, having many elements, the conventional hinge device is disadvantageous to miniaturization of the telephone and has a structure unfavorable in electrically connecting the flip cover to a PCB (Printed Circuit Board) of the body so that the speaker may not be installed in the flip cover. The excessive number of the elements may increase a failure rate and decrease a productivity. The foregoing drawbacks of the conventional hinge device make it difficult to provide a small and light mobile telephone.

SUMMARY OF THE INVENTION

It is therefore an object of the present invention to provide a hinge device with conducting means in a flip type mobile telephone.

It is another object of the present invention to provide a hinge device capable of enabling a flip cover to be detached from a body.

It is still another object of the present invention to provide a hinge device with conducting means for connecting a speaker mounted on a flip cover to a body, thus contributing to miniaturization of a mobile telephone.

To achieve the above object, there is provided a hinge device of a flip type mobile telephone including a body and a flip cover with a speaker mounted thereon. In the hinge device, a hinge assembly includes a spring connector pin; a hinge shaft having at least one open end, a pair of opposite protrusions, a pair of opposite indents, and a cylindrical inner wall into which the connector pin is pressed, said shaft being movable along a rotation axis; a hinge housing having at least one open end into which the hinge shaft is inserted; guide means for enabling the hinge shaft to move rectilinearly in the hinge housing; and securing means for preventing separation of the hinge shaft from the hinge housing. The hinge device further includes a coupling member having a pair of opposite protrusions and a pair of opposite indents, for keeping in sliding surface contact with the hinge shaft; and conducting means interposed between the hinge assembly and the coupling member, for electrically connecting the speaker to a printed circuit board of the body.

The spring connector pin includes a first conductive hinge can, a second conductive hinge can secured to the first hinge can, and a coil spring interposed between the first and second hinge cans, for providing a restitution force.

Preferably, the securing means comprises grooves formed at the indents of the hinge shaft, and protrusions formed at the end of the hinge housing, to be inserted into the grooves when the hinge shaft is pressed into the hinge housing.

The conducting means comprises a conducting member interposed between the spring connector pin and the coupling member. Preferably, the conducting member may be a contact plate or a conductive spiral coil spring.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF PREFERRED EMBODIMENTS

Preferred embodiments of the present invention will be described hereinbelow with reference to the accompanying drawings. In the following description, well known functions or constructions are not described in detail since they would obscure the invention in unnecessary detail.

Figure 1:
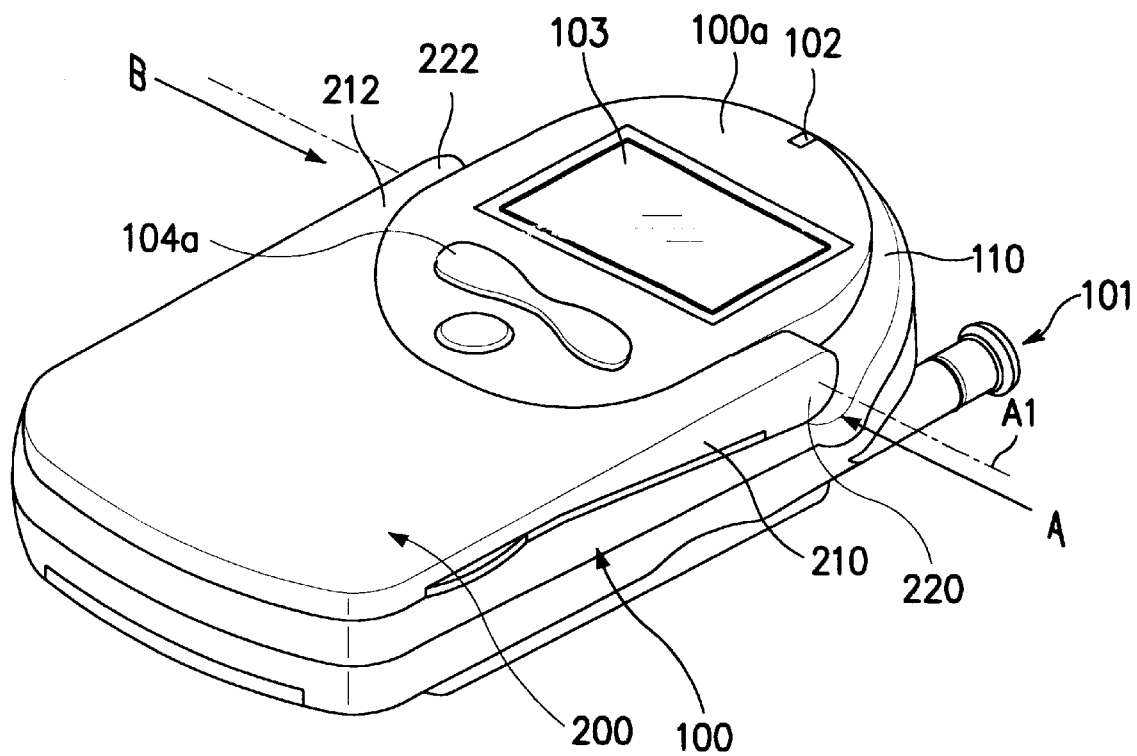
FIG. 1 is a perspective view of a mobile telephone with a hinge device according to a first embodiment of the present invention.

FIG. 1 illustrates a flip type (to be exact, flip-up type) mobile telephone with a hinge device according to a first embodiment of the present invention. As illustrated, the flip type mobile telephone includes a body 100, a flip cover 200 and a hinge device (see FIG. 2) for openably coupling the flip cover 200 to the body 100. The flip cover 200 revolves on an axis A1 so that it may be opened and closed with respect to the body 100.

The body 100 has an antenna device 101 mounted on an upper corner and a call lamp 102 mounted on an upper center. The call lamp 102 blinks, when the mobile telephone receives an incoming call, to notify the user of the incoming call. Under the call lamp 102, an LCD (Liquid Crystal Display) unit 103 being a data output device is mounted on the front of the body 100. Under the LCD unit 103, a keypad (see FIG. 2), being a data input device, having a plurality of numeric keys and function keys is placed on the front of the body 100. Under the keypad, a microphone unit (see FIG. 2) is mounted at the lower end of the body 100. Further, a speaker (see FIG. 9) mounted on the flip cover 200 serves as a receiving device (or earpiece) and the microphone unit placed at the lower end of the body 100 serves as a transmitting device (or mouthpiece). The LCD unit 103 is structured such that an LCD window is normally exposed, no matter whether the flip cover is opened or closed. Accordingly, the user can see information displayed on the LCD window of the LCD unit 103, without opening the flip cover 200.

As illustrated, the keypad is covered with the flip cover 200. Further, the call lamp 102 and the LCD unit 103 are disposed at a protrusion 100a of the body 100, and several keys 104a of the keypad is also disposed at the protrusion 100a. Along a rear circumference of the protrusion 100a, is formed a stopper 110 for preventing the flip cover 200 from being opened excessively. The flip cover 200 has necks 210 and 212 extending from either end thereof, and coupling members 220 and 222 are formed at the ends of the necks 210 and 212, respectively. The coupling members 220 and 222 are coupled to the hinge device. The hinge device for openably coupling the flip cover 200 to the body 100 is illustrated in FIGS. 2 and 3.

Figure 2:
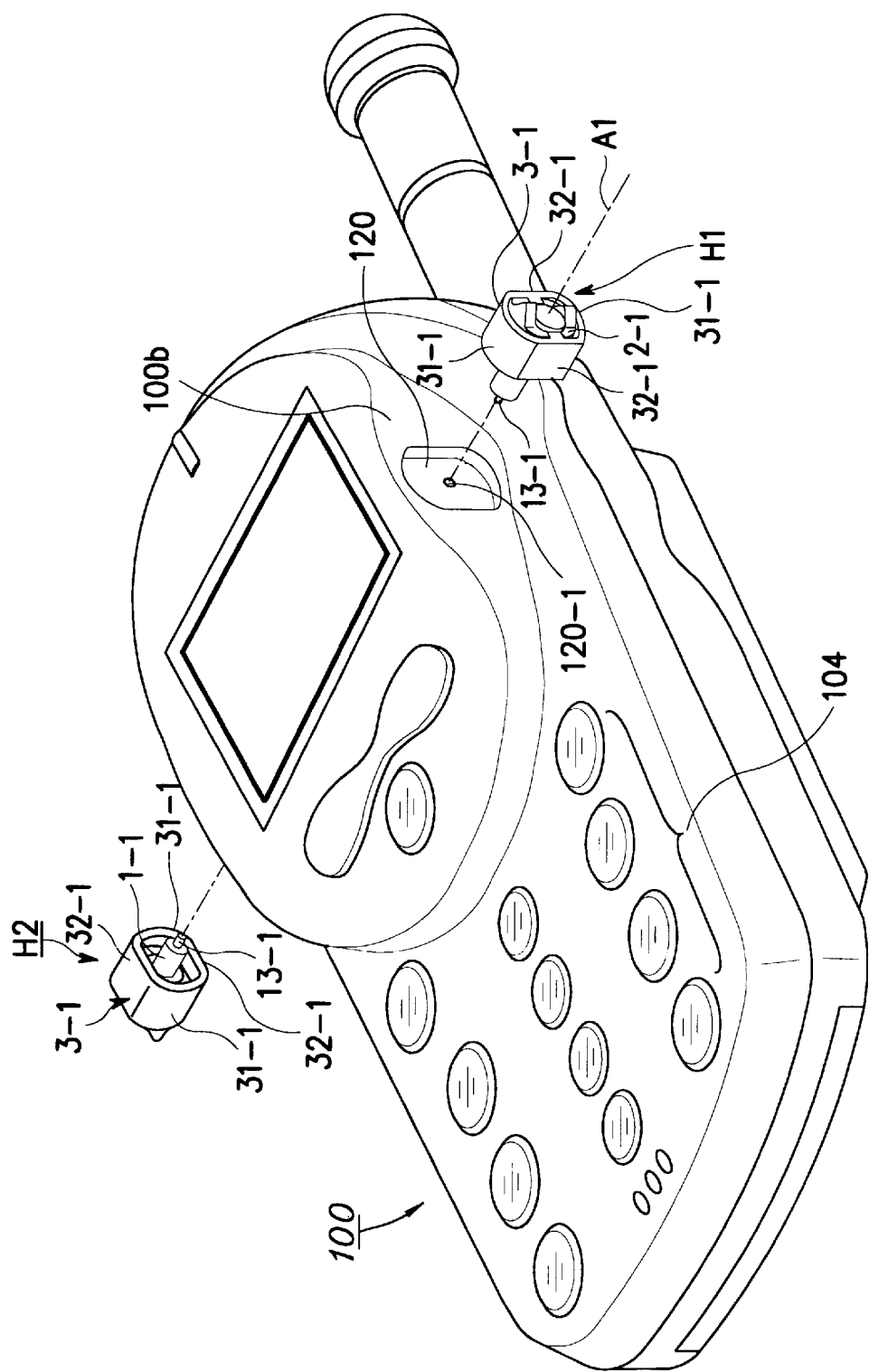
FIG. 2 is an assembly diagram illustrating how to assemble a hinge assembly in the mobile telephone according to the first embodiment of the present invention.
Figure 3:
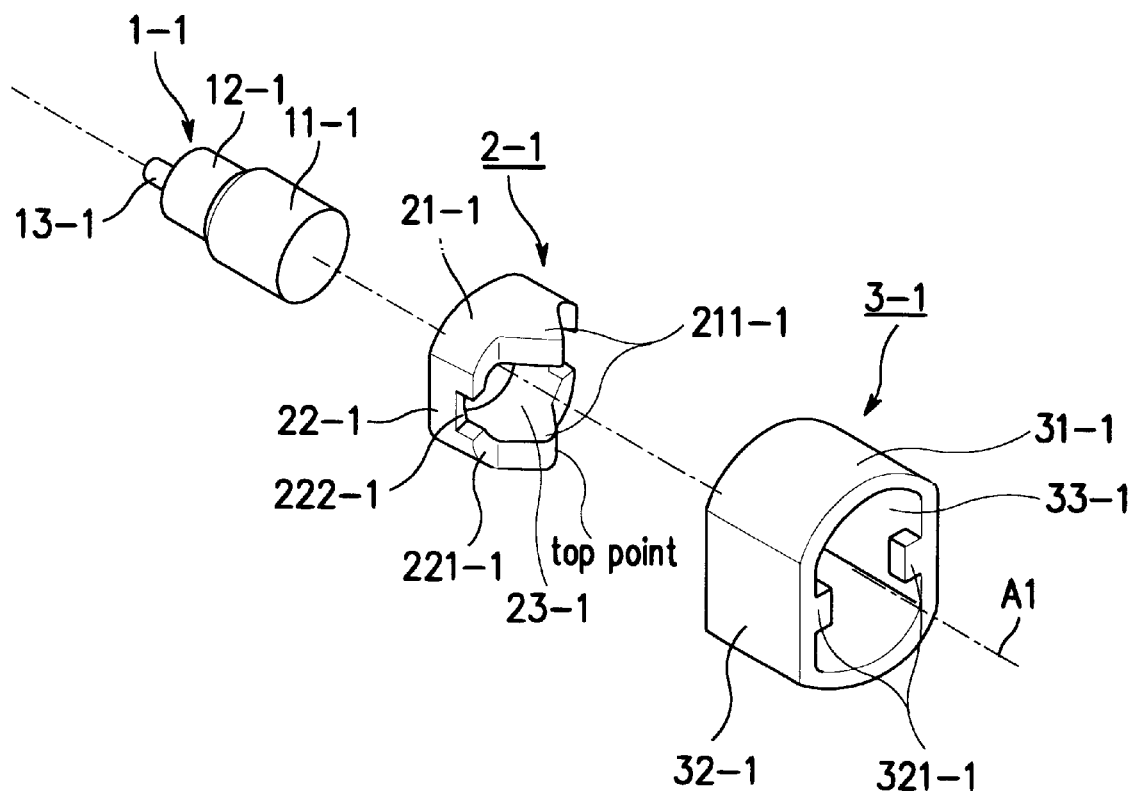
FIG. 3 is an assembly diagram of the hinge assembly according to the first embodiment of the present invention.

FIG. 2 is an assembly diagram for explaining how to assemble a hinge assembly in the mobile telephone according to the first embodiment of the present invention. Referring to FIG. 2, the hinge device with the conducting means according to the first embodiment of the present invention includes two independent hinge assemblies H1 and H2, and associated recesses 120 are formed at either side of the LCD unit 103. The hinge assemblies H1 and H2 are inserted into the associated recesses 120, respectively, and then assembled in the coupling members 220 and 222 of the flip cover 200.

The hinge assemblies H1 and H2 have the same elements and structure. However, the hinge assembly H1 is inserted into the recess 120 vertically, while the hinge assembly H2 is inserted into the recess 120 horizontally. That is, the hinge assembly H1 is inserted into the recess 120 such that a virtual line drawn between a pair of opposite curved surfaces 31-1 is placed vertically, and the hinge assembly H2 is inserted into the recess 120 such that a virtual line drawn between a pair of opposite plane surfaces 32-1 is placed vertically.

Here, the hinge assemblies H1 and H2 have fixing means for fixing the hinge assemblies H1 and H2 to the associated recesses 120, respectively. The fixing means prevent the hinge assemblies H1 and H2 assembled in the coupling members 220 and 222 of the flip cover 200 from rotating, while the flip cover 200 is opened and closed. The fixing means are composed of the opposite curved surfaces 31-1 and the opposite plane surfaces 32-1, formed on hinge housings 3-1. Side walls 100b of the body 100 are stepped to form the recesses 120 having a negative shape of the hinge housings 3-1.

In addition, the recesses 120 have holes 120-1, formed at the bottom center, and fixing projections 13-1 are formed on spring connector pins 1-1 of the hinge assemblies H1 and H2. The projections 13-1 are inserted into the holes 120-1 so that the hinge assemblies H1 and H2 may be fixed to the recesses 120.

The hinge assemblies H1 and H2 are composed of the spring connector pins 1-1, hinge shafts 2-1 into which the spring connector pins 101 are pressed, and the hinge housings 3-1 into which the hinge shafts 2-1 are pressed. The hinge assemblies H1 and H2 are disclosed in detail in FIGS. 3 and 4.

In the embodiment, although the hinge assembly H1 is inserted into the associated recess 120 horizontally and the hinge assembly H2 is inserted the associated recess 120 vertically, it can be understood that the hinge assemblies H1 and H2 may be inserted at different angles according to the opening angle between the body 100 and the flip cover 200. Further, one of the two hinge assemblies H1 and H2 can be removed, or the hinge assemblies H1 and H2 can be symmetrically inserted into the associated recesses 120.

Furthermore, in the embodiment, although the hinge assemblies H1 and H2 are inserted into the associated recesses 120 formed at either side of the LCD unit 103, it can be appreciated that the hinge assemblies H1 and H2 can also be installed in the upper end of the body 100 or at either side of the keypad 104. Of course, the flip cover 200 should be properly changed in shape according to the change of the places where the flip cover 200 is installed. In conclusion, the novel hinge device can be applied not only to the flip type mobile telephone but also to the folder type mobile telephone.

Figure 4:
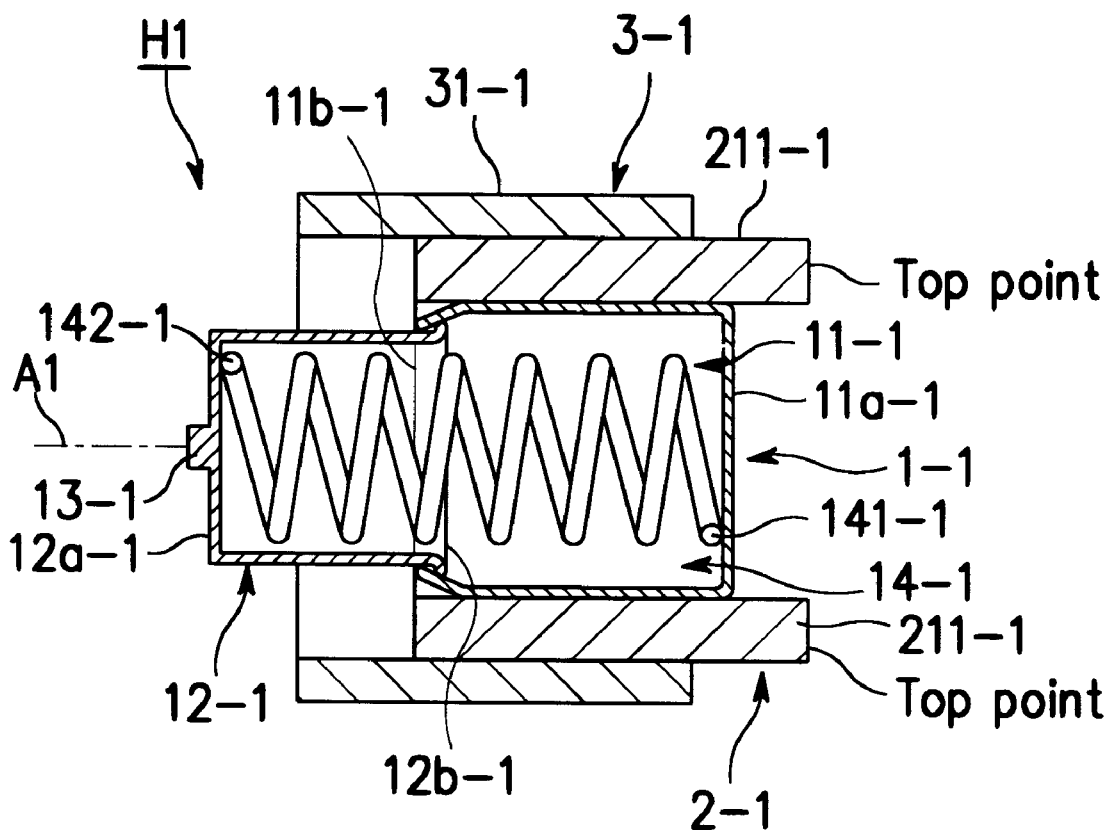
FIG. 4 is a cross-sectional view of the assembled hinge assembly according to the first embodiment of the present invention.

FIG. 3 is an assembly diagram of the hinge assembly H1, and FIG. 4 is a cross-sectional view of the assembled hinge assembly H1. As stated above, the hinge assemblies H1 and H2 have the same structure, and for the convenience of explanation, reference will be made to the hinge assembly H1 only.

Referring to FIGS. 3 and 4, the hinge assembly H1 includes the spring connector pin 1—1, the hollow hinge shaft 2-1 into which the spring connector pin 1—1 is pressed, and the hollow hinge housing 3-1 into which the hinge shaft 2-1 is pressed. The spring connector pin 1-1 is composed of a first hinge can 11-1, a second hinge can 12-1 secured to the first hinge can 11-1, a coil spring 14-1 intervening between the first hinge can 11-1 and the second hinge can 12-1.

In FIG. 4, the first hinge can 11-1 has a diameter larger than that of the second hinge can 12-1 so that the second hinge can 12-1 may be freely inserted and withdrawn into/from the first hinge can 11-1. The first hinge can 11-1 has a perfectly closed end 11a-1 and a perfectly opened end 11b-1. Similarly, the second hinge can 12-1 has a perfectly closed end 12a- 1 and a perfectly opened end 12b-1. The coil spring 14-1 has an end 141-1 in contact with the perfectly closed end 11a-1 of the first hinge can 11-1 and another end 142-1 in contact with the perfectly closed end 12a-1 of the second hinge can 12-1. Accordingly, when a force is applied to either the first hinge can 11-1 or the second hinge can 12-1, the spring connector pin 1—1 is compressed. In the meantime, if the force applied to either the first hinge can 11-1 or the second hinge can 12-1 is removed, the spring connector pin 1—1 is stretched out. That is, the spring connector pin 1-1 is compressed and stretched out along an axis A1.

The spring connector pin 1—1 is pressed into the hinge shaft 2-1. As the flip cover 200 is opened and closed, the hinge shaft 2-1 moves along the axis A1 together with the spring connector pin 101.

In FIG. 3, the hollow hinge shaft 2-1 has a perfectly opened end 23-1. Further, the hollow hinge shaft 2-1 has a pair of opposite protrusions 211-1 and a pair of opposite indents 221-1, formed at an end thereof, wherein the protrusions 211-1 and the indents 221-1 are symmetrical to each other, respectively. The indents 221-1 each have grooves 222-1 formed at the middle. The hinge shaft 2-1 has a pair of opposite curved surfaces 21-1 and a pair of opposite plane surfaces 22-1. The protrusions 211-1 are formed at the curved surfaces 21-1 and the indents 221-1 are formed at the plane surfaces 22-1. Further, the hinge shaft 2-1 has a cylindrical inner wall so that the first hinge can 11-1 may freely move into the hinge shaft 2-1.

The hollow hinge shaft 3-1 has an inner wall in a negative shape of the hinge shaft 2-1, so that the hinge shaft 2-1 may be inserted into the hinge housing 3-1. The hinge housing 3-1 has an open end 33-1 along the axis A1. Further, the hinge housing 3-1 has a pair of opposite curved surfaces 31-1 and a pair of opposite plane surfaces 32-1, wherein the curved surfaces 31-1 and the plane surfaces 32-1 are symmetrical to each other, respectively. When the hinge shaft 2-1, into which the spring connector pin 1-1 is pressed, is inserted into the hinge housing 3-1, the hinge shaft 2-1 can move along the axis A1 but cannot revolve on the axis A1. That is, the hinge shaft 2-1 moves rectilinearly along the hinge housing 3-1 by way of guide means.

Further, the hinge assembly H1 has securing means for securing the hinge shaft 2-1 to the hinge housing 3-1 so as to prevent separation of the hinge shaft 2-1 from the hinge housing 3-1. The securing means is composed of the grooves 222-1 and protrusions 321-1 which are symmetrically formed at the open end 33-1 of the hinge housing 3-1. Accordingly, when the hinge shaft 2-1 is inserted into the hinge housing 3-1, the protrusions 321-1 are inserted into the grooves 221-1, thereby preventing separation of the hinge shaft 2-1 from the hinge housing 3-1.

Now, reference will be made to the coupling members 220 and 222 which are engaged with the hinge assemblies H1 and H2.

Figure 5A:
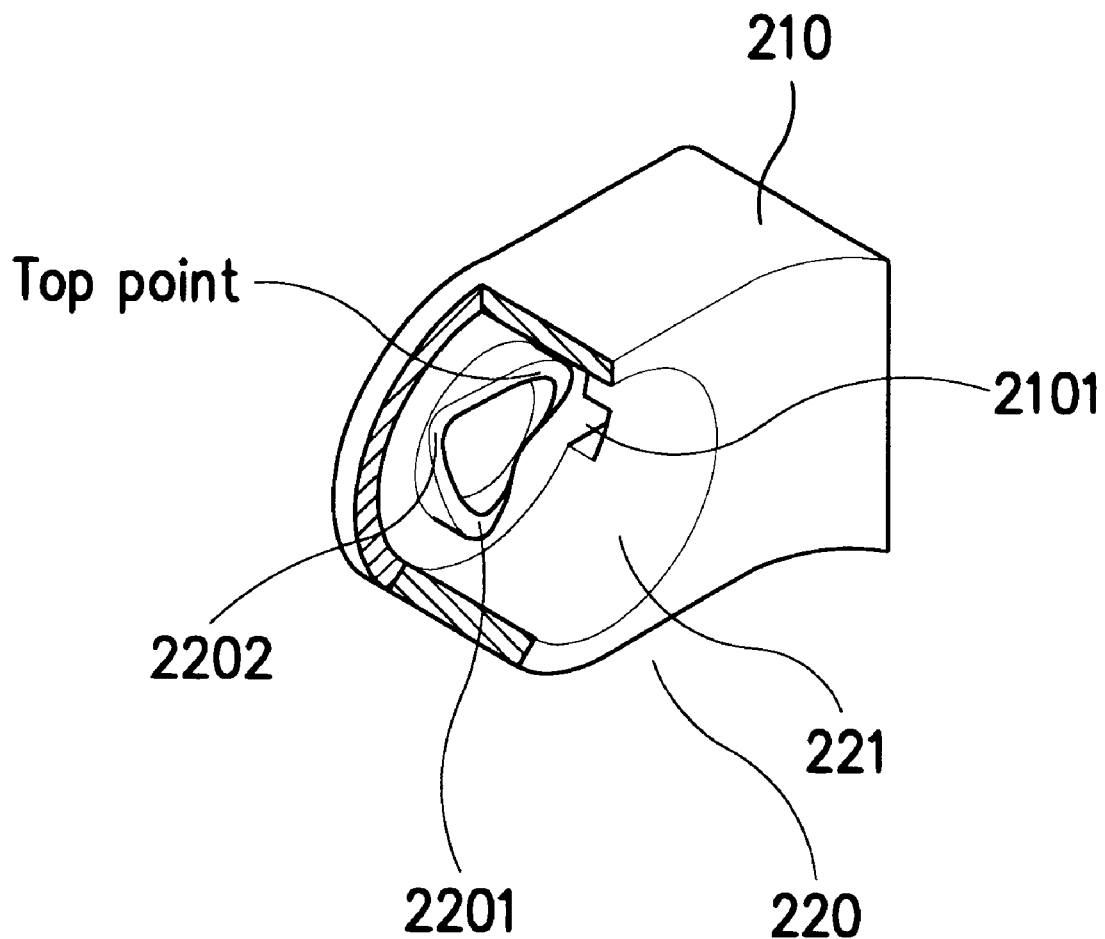
FIG. 5A is a perspective view illustrating a coupling member on one side according to the first embodiment of the present invention.

FIG. 5A is a partially cross-sectional view illustrating the coupling member 220 on one side according to the first embodiment of the present invention. In FIG. 5A, the coupling member 220 formed at the neck 210 of the flip cover 200 has a slot 221 to which the hinge assembly H1 is coupled. In the slot 221, are formed a pair of opposite protrusions 2201 and a pair of opposite indents 2202 corresponding to the indents 221-1 and the protrusions 211-1 of the hinge shaft 2-1, respectively. Here, a virtual line drawn between the opposite protrusions 2201 is tilted. Further, the slot 221 has an opening 2101 extended to the neck 210, through which an electric wire for the speaker passes.

Figure 5B:
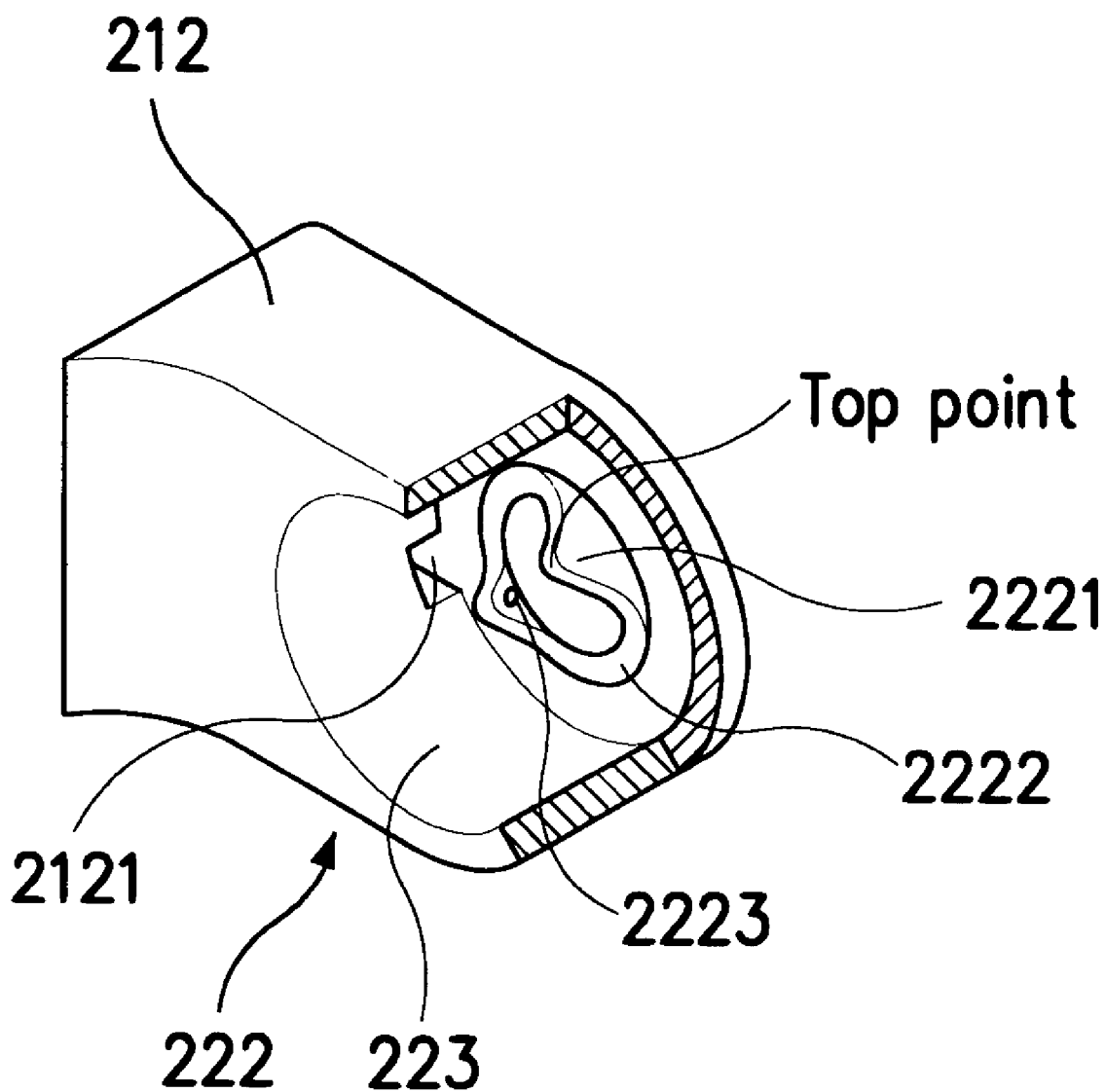
FIG. 5B is a perspective view illustrating a coupling member on another side according to the first embodiment of the present invention.

FIG. 5B is a partially cross-sectional view illustrating the coupling member 222 on another side according to the first embodiment of the present invention. In FIG. 5B, the coupling member 222 formed at the neck 212 of the flip cover 200 has a slot 223 to which the hinge assembly H2 is coupled. In the slot 223, are formed a pair of opposite protrusions 2221 and a pair of opposite indents 2222 corresponding to the indents 221-1 and the protrusions 211-1 of the hinge shaft 2-1, respectively. Here, a virtual line drawn between the opposite protrusions 2221 is tilted. Further, the slot 223 has an opening 2121 extended to the neck 212, through which an electric wire for the speaker passes. One of the protrusions 2221 also has an opening 2223 through which the electric wire for the speaker passes. Here, the reason that the virtual lines drawn between the opposite protrusions 2201 and 2221 are titled as illustrated in FIGS. 5A and 5B, is to provide the opening angle between the flip cover 200 and the body 100 when the flip cover 200 is combined with the hinge assemblies H1 and H2. Operation of providing the opening angle will be described hereinbelow with reference to FIGS. 6A to 8B.

Figure 6A:
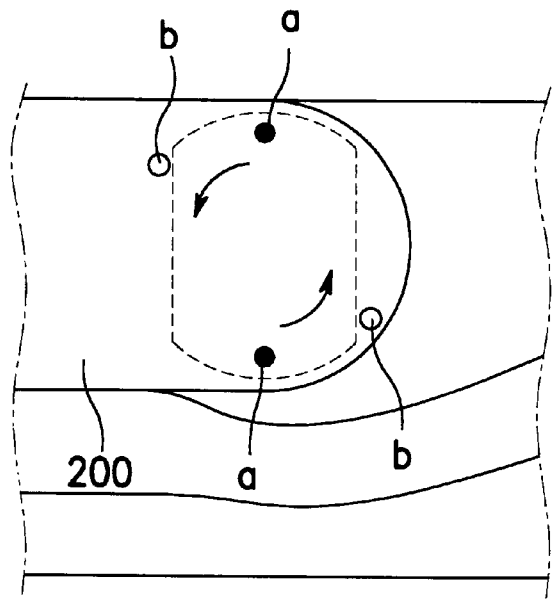
FIGS. 6A and 6B are views illustrating the states of the hinge device when the flip cover is closed.
Figure 6B:
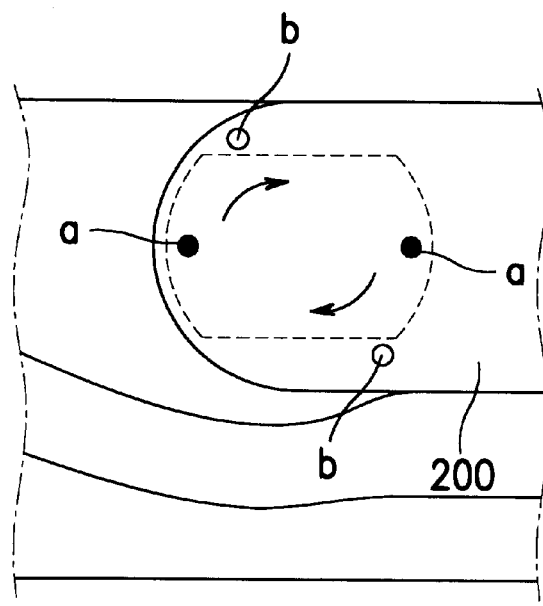
Figure 7A:
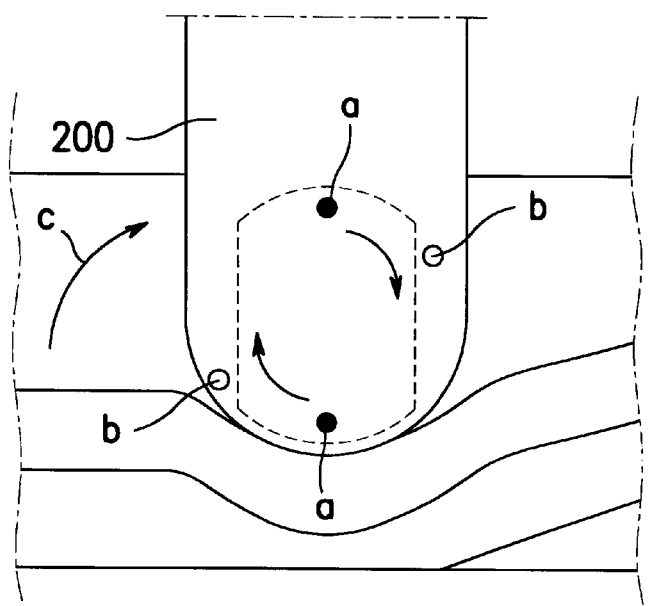
FIGS. 7A and 7B are views illustrating the states of the hinge device when the flip cover is opened approximately 90°.
Figure 7B:
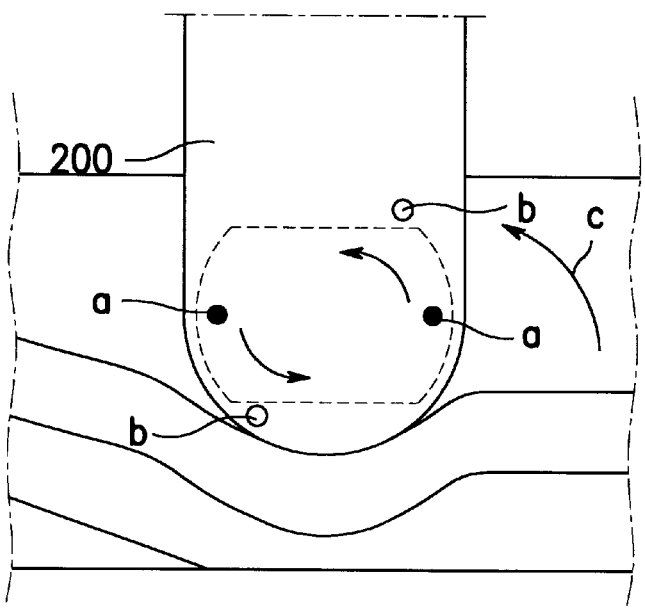
Figure 8A:
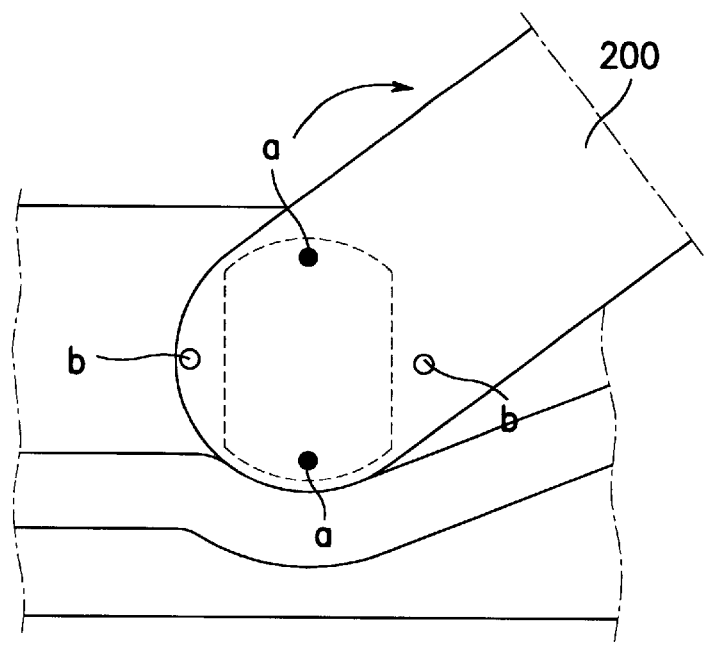
FIGS. 8A and 8B are views illustrating the states of the hinge device when the flip cover is opened to an opening angle.
Figure 8B:
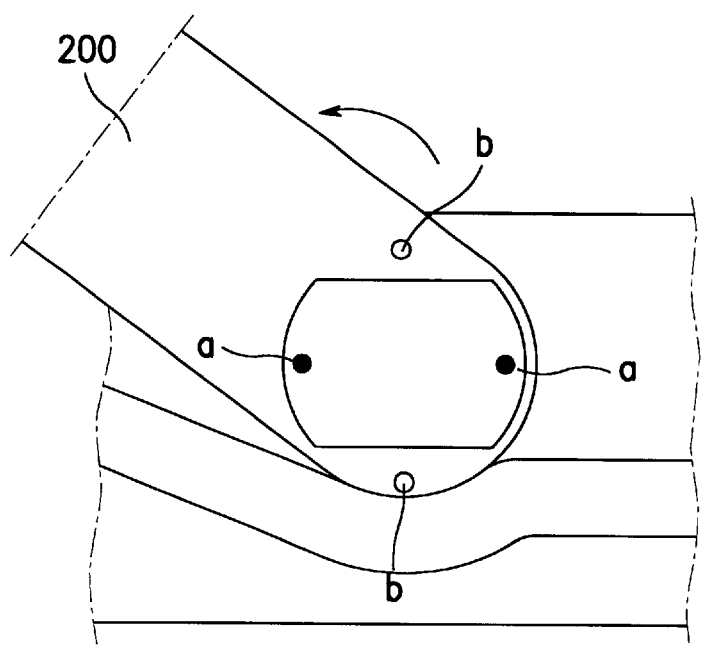

FIG. 6A illustrates a state of the coupling member 220 when the flip cover 200 is closed, FIG. 6B illustrates a state of the coupling member 222 when the flip cover 200 is closed . FIG. 7A illustrates a state of the coupling member 220 when the flip cover 200 is opened by 90°0, and FIG. 7B illustrates a state of the coupling member 222 when the flip cover 200 is opened 90°. FIG. 8A illustrates a state of the coupling member 220 when the flip cover 200 is opened to the opening angle, and FIG. 8B illustrates a state of the coupling member 222 when the flip cover 200 is opened to the opening angle. Among the figures, FIGS. 6A, 7A and 8A illustrate operating states of the hinge device seen in an arrow direction A of FIG. 1, and FIGS. 6B, 7B and 8B illustrate operating states of the hinge device seen in an arrow direction B of FIG. 1. In FIGS. 6A to 8B, points "a" denote the top points on the protrusions 211-1 of the hinge shaft 2-1, and points "b" denote the top points on the protrusions 2201 and 2221 formed in the slots 221 and 223 of the coupling members 220 and 222.

While the flip cover 200 is opened and closed with respect to the body 100, the protrusions 211-1 of the hinge shaft 2-1 slidingly contact the protrusions 2201 and 2221 of the coupling members 220 and 222. Operation of opening/closing the flip cover 200 will be described on the basis of the top points "a" on the protrusions 211-1 of the hinge shaft 2-1 and the top points "b" on the protrusions 2201 and 2221 of the coupling members 220 and 222 illustrated in FIGS. 3 to 5B.

Referring to FIGS. 6A and 6B, when the mobile telephone is in an idle state (or on-hook state), the flip cover 200 is opened by 0°, i.e., closed to the body 100. In this on-hook state, the top points on the protrusions 211-1 of the hinge shaft 2-1 are positioned at the points "a" and the top points on the protrusions 2201 and 2221 of the coupling members 220 and 222 are positioned at the points "b". That is, the protrusions 211-1 of the hinge shaft 2-1 are firmly engaged with the indents 2202 and 2222 of the coupling members 220 and 222. As stated above, the hinge shaft 2-1 has a restitution force by means of the coil spring 14-1 inserted into the spring connector pin 1-1, and this restitution force maintains the close surface contact between the protrusions 2201 and 2221 of the coupling members 220 and 222 and the indents 221-1 of the hinge shaft 2-1. Here, the flip cover 200 is forced in the arrow direction by the restitution force of the coil spring 14-1 so that the flip cover 200 may be tightly closed to the body 100. Accordingly, the flip cover 200 may not be opened by itself, unless the user forcedly opens it.

Referring to FIGS. 7A and 7B, when the flip cover 200 is opened by 90° in an arrow direction C, the points "b" pass over the top points "a" on the protrusions 211-1 of the hinge shaft 2-1, maintaining the sliding surface contact with the protrusions 211-1 of the hinge shaft 2-1, to reach the positions shown in FIGS. 7A and 7B. Accordingly, the flip cover 200 is forced in the arrow direction, which forces the flip cover 200 to be opened to the opening angle. In this state, the protrusions 211-1 of the hinge shaft 2-1 maintain the surface contact with the protrusions 2201 and 2221 of the coupling members 220 and 222, by means of the coil spring 14-1.

Referring to FIGS. 8A and 8B, when the flip cover 200 is opened by about 130–140° (of the opening angle), the mobile telephone is in an off-hook state where the user can have a telephone conversation. In this state, the indents 2202 and 2222 of the coupling members 220 and 222 contact the protrusions 211-1 of the hinge shaft 2-1, and the protrusions 2201 and 2221 of the coupling members 220 and 222 contact the indents 221-1 of the hinge shaft 2-1. That is, the hinge shafts 2-1 are firmly engaged with the coupling members 220 and 222 of the flip cover 200. In this circumstance, a virtual line drawn between the top points "b" on the protrusions 2201 and 2221 of the coupling members 220 and 222 is perpendicular to a virtual line drawn between the top points "a" on the protrusions 211-1 of the hinge shaft 2-1, thus maintaining the opening angle.

It is preferable that the protrusions and indents of the hinge shaft 2-1 and the coupling members 220 and 222 should have curved surfaces to secure the sliding surface contact.

Figure 9:
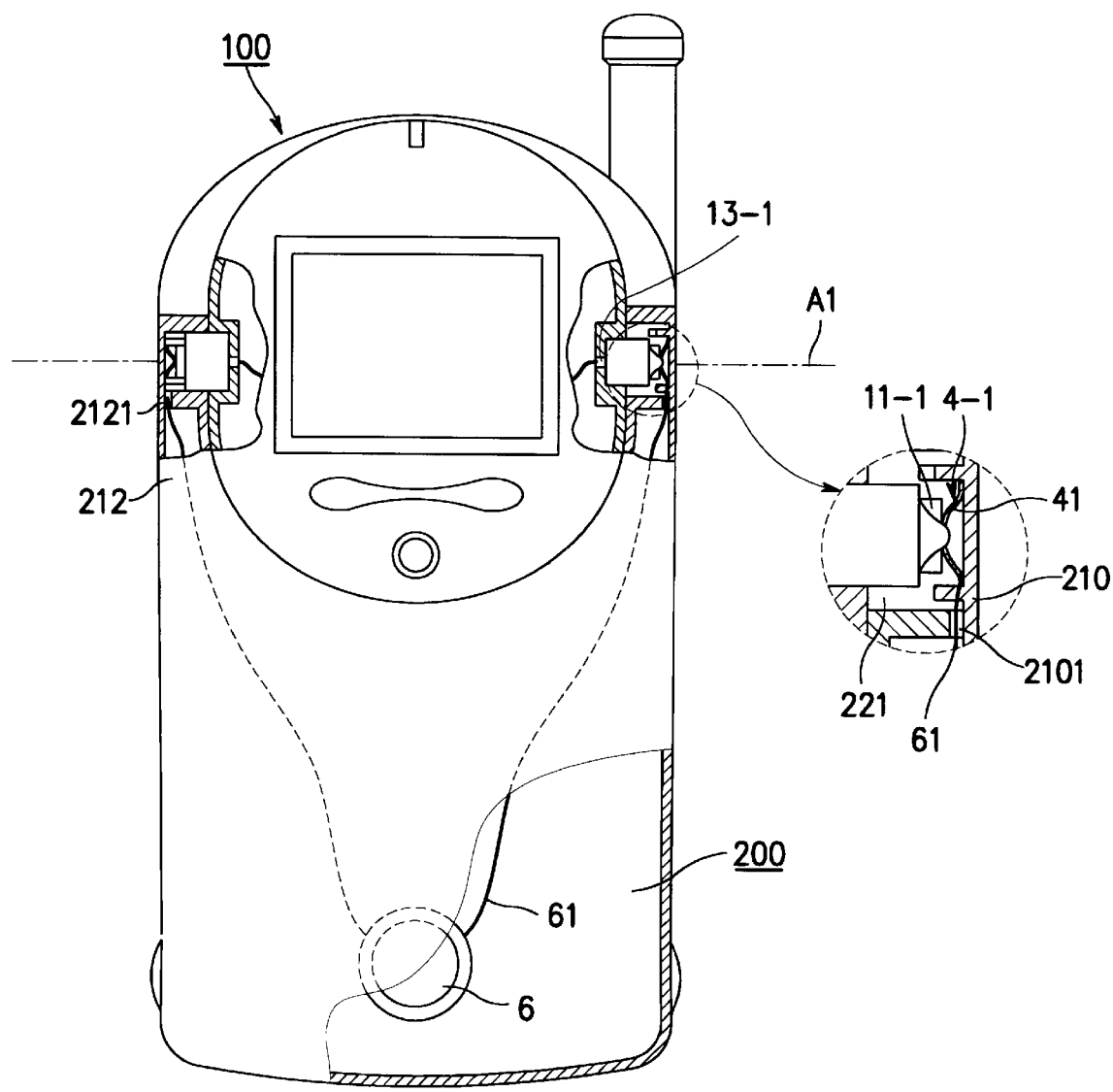
FIG. 9 is a partial cross-sectional view illustrating the hinge device with conducting means according to the first embodiment of the present invention.
Figure 10:
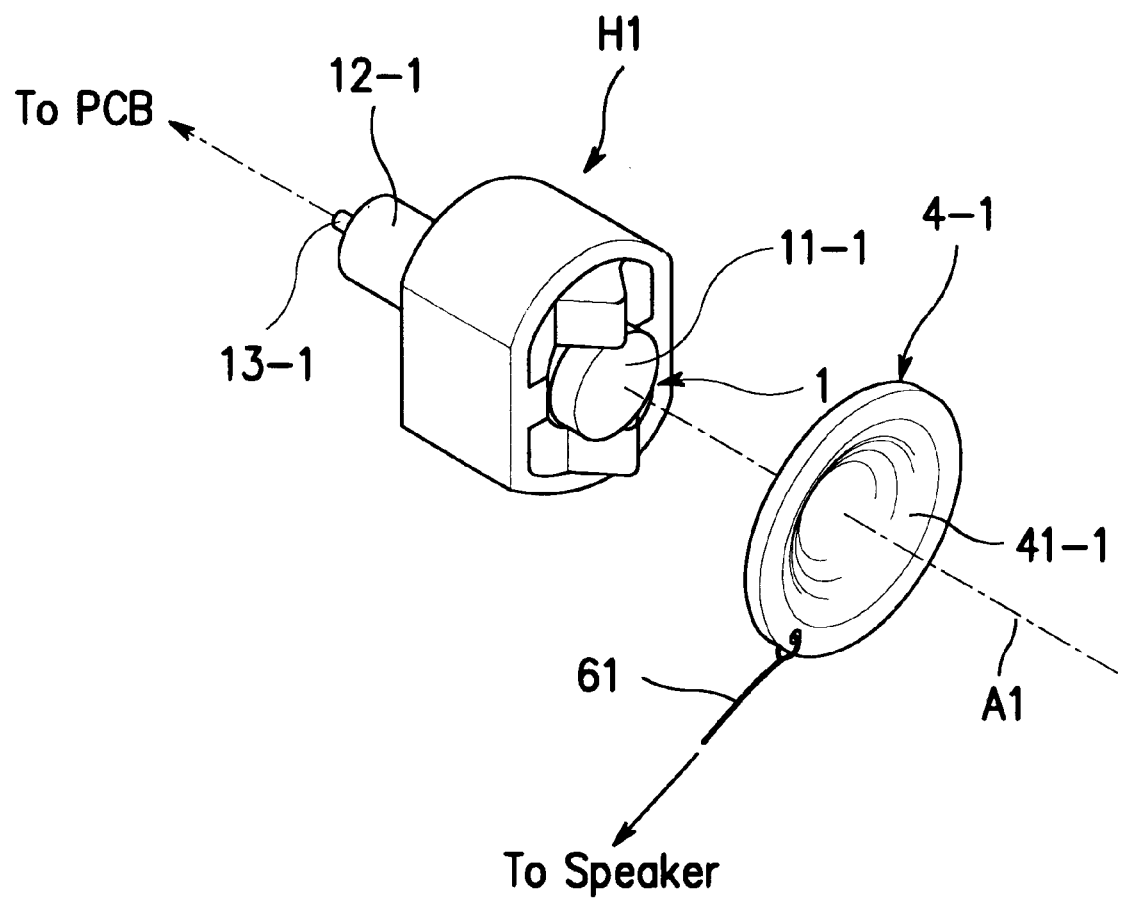
FIG. 10 is an assembly diagram of the conducting means according to the first embodiment of the present invention.

FIG. 9 is a partial cross-sectional view illustrating how to electrically connect a speaker 6 mounted on the flip cover 200 to the body 100, and FIG. 10 is an assembly diagram illustrating how to assemble a contact plate 4-1 in the hinge assembly H1.

Now, reference will be made to the conducting means of the hinge device. In the embodiment, for miniaturization of the mobile telephone, the speaker 6 is mounted on the flip cover 200. The conducting means according to the present invention electrically connects the speaker 6 mounted on the flip cover 200 to a printed circuit board (PCB) (not shown) of the body 100. The conducting means is composed of the contact plate 4-1 and the spring connector pin 1-1 which is in contact with the contact plate 4-1.

As described and illustrated in FIG. 4, the spring connector pin 1-1 includes the first hinge can 11-1, the second hinge can 12-1 secured to the first hinge can 11-1, and the coil spring 14-1 intervening between the first and second hinge cans 11-1 and 12-1 . The first and second hinge cans 11-1 and 12-1 are conductive, and the contact plate 4-1 in contact with the closed end 11a-1 of the first hinge can 11-1 is also conductive. The contact plate 4-1 is mounted on the bottom of the slot 221. The closed end 11a-1 of the first hinge can 11-1 keeps in close contact with the contact plate 4-1 by the restitution force of the coil spring 14-1. Further, the neck 210 of the flip cover 200 has the opening 2101 through which an electric wire 61 for the speaker 6 passes. The electric wire 61 is connected to the contact plate 4-1 mounted on the bottom of the slot 221 by way of the opening 2101. Moreover, the projection 13-1 of the spring connector pin 1-1 is connected to the PCB of the body 100 by using an electric wire.

Referring to FIG. 10, the disklike contact plate 4-1 has a convex portion 41-1 formed at a central portion thereof so that it may readily keep in contact with the first hinge can 11-1. Preferably, the contact plate 4-1 should be conductive and elastic. Here, contact plate 4-1 can be mounted on the bottom of the slot 221 by bonding or by forming holes and protrusions by injection molding.

As a result thereof, the wire 61 coming out from the speaker 6 is connected to the contact plate 4-1 by way of the opening 2101 formed at the neck 210, and the contact plate 4-1 is then connected to the PCB of the body 100 by way of the spring connector pin 1—1.

Figure 11:
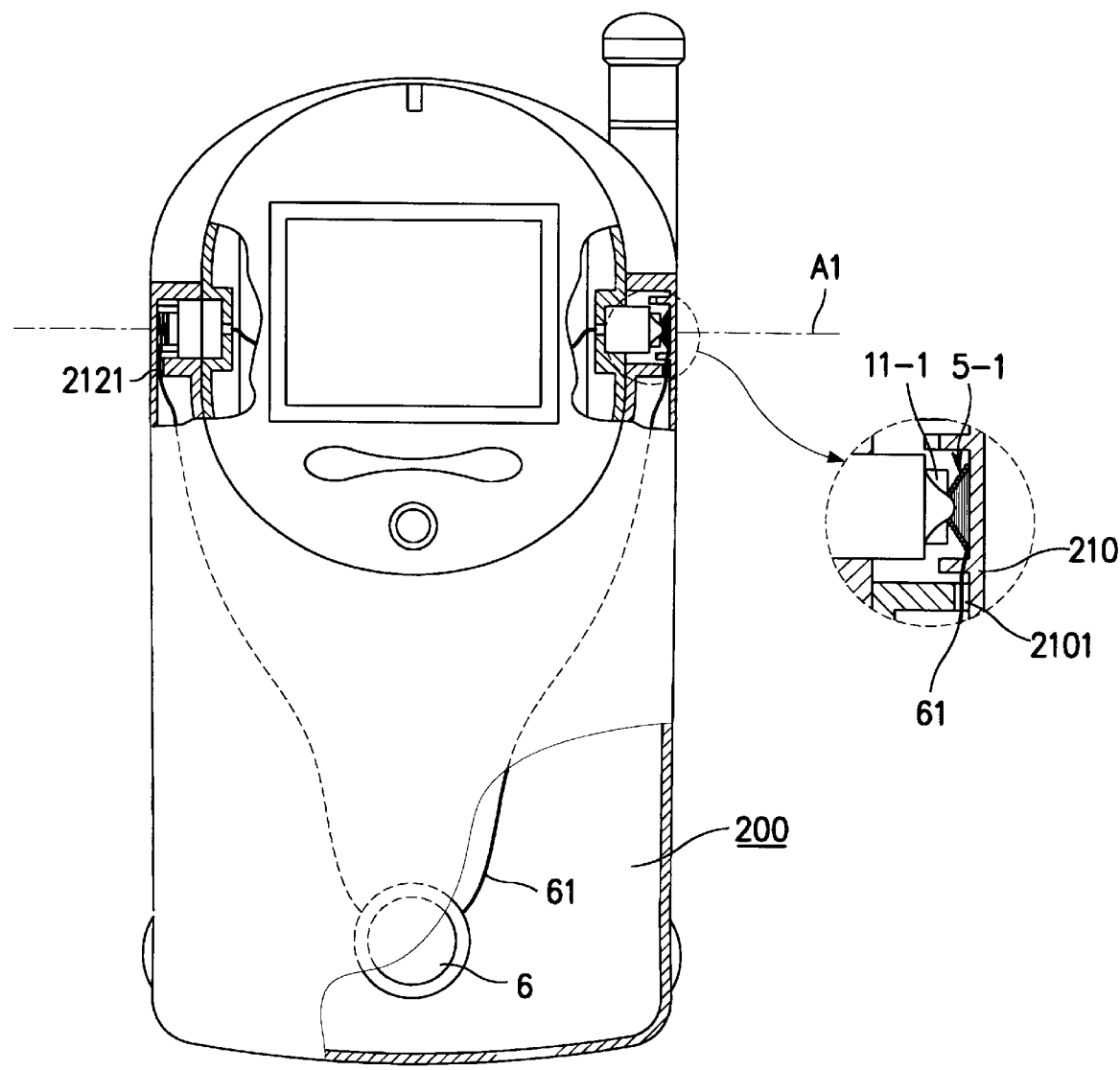
FIG. 11 is a partial cross-sectional view illustrating the hinge device with the conducting means according to the first embodiment of the present invention.
Figure 12:
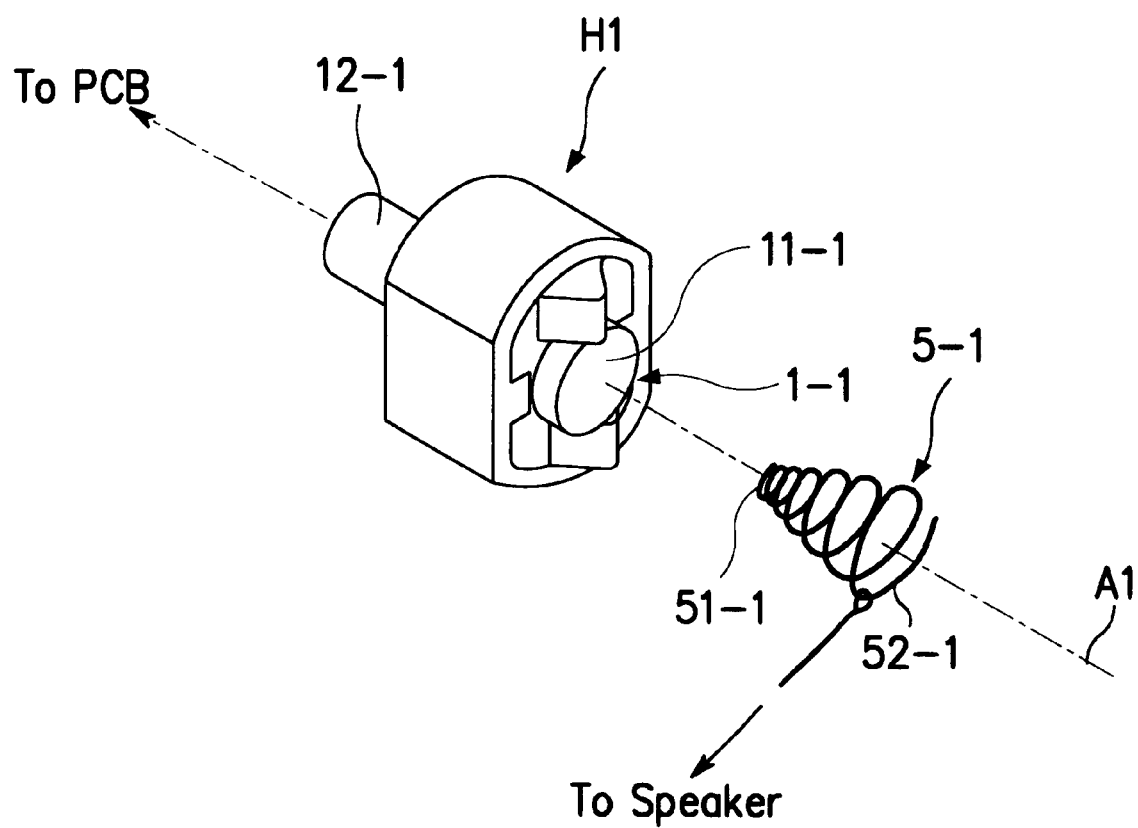
FIG. 12 is an assembly diagram of the conducting means according to the first embodiment of the present invention.

As illustrated in FIGS. 11 and 12, it is also possible to replace the contact plate 4-1 with a spiral coil spring 5-1, in electrically connecting the wire 61 coming out from the speaker 6 to the first hinge can 11-1. Of course, the coil spring 5-1 should be conductive and elastic. Preferably, either end of the coil spring 5-1 should have different diameter. Here, an end 51-1 having a small diameter contacts the closed end 11a-1 of the first hinge can 11-1 and another end 52-1 having a large diameter contacts the bottom of the slot 221.

In result, the wire 61 coming out from the speaker 6 is connected to the coil spring 5-1 by way of the opening 2101 formed at the neck 210, and the coil spring 5-1 is then connected to the PCB of the body 100 by way of the spring connector pin 1—1.

Figure 13:
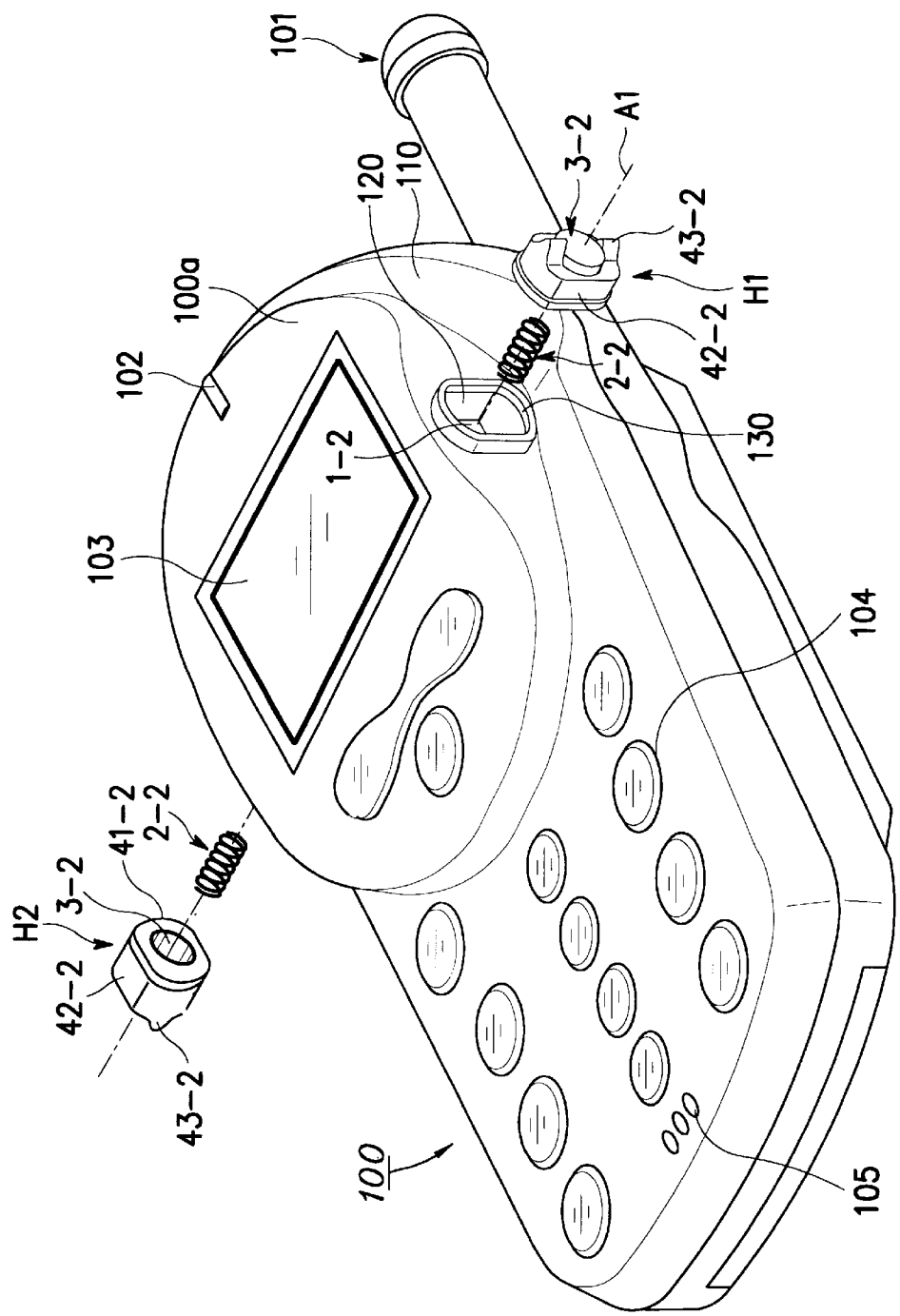
FIG. 13 is an assembly diagram illustrating how to assemble a hinge assembly to the body according to a second embodiment of the present invention.

FIG. 13 illustrates a mobile telephone with a hinge device according to a second embodiment of the present invention. The mobile telephone of FIG. 13 has the same structure as that illustrated in FIGS. 1 and 2 except for the hinge device. Now, a description will be given hereinbelow as to the hinge device according to the second embodiment of the present invention.

Referring to FIG. 13, the hinge device includes hinge assemblies H1 and H2. The hinge assemblies H1 and H2 each are installed in associated recesses 120 formed at both ends of a protrusion 100a prepared at the upper end of the body 100, and then assembled in the flip cover 200. The hinge assemblies H1 and H2 have the same elements and structure, but installed differently from each other. That is, the hinge assembly H1 is inserted into the associated recess 120 uprightly, while the hinge assembly H2 is inserted into the associated recess 120 horizontally. The recesses 120 formed at either end of the body 100 have the negative shapes of the corresponding hinge assemblies H1 and H2, respectively. The hinge assemblies H1 and H2 are detachable from the recesses 120 of the body 100. Furthermore, the flip cover 200 is also detachable from the hinge assemblies H1 and H2.

Figure 14:
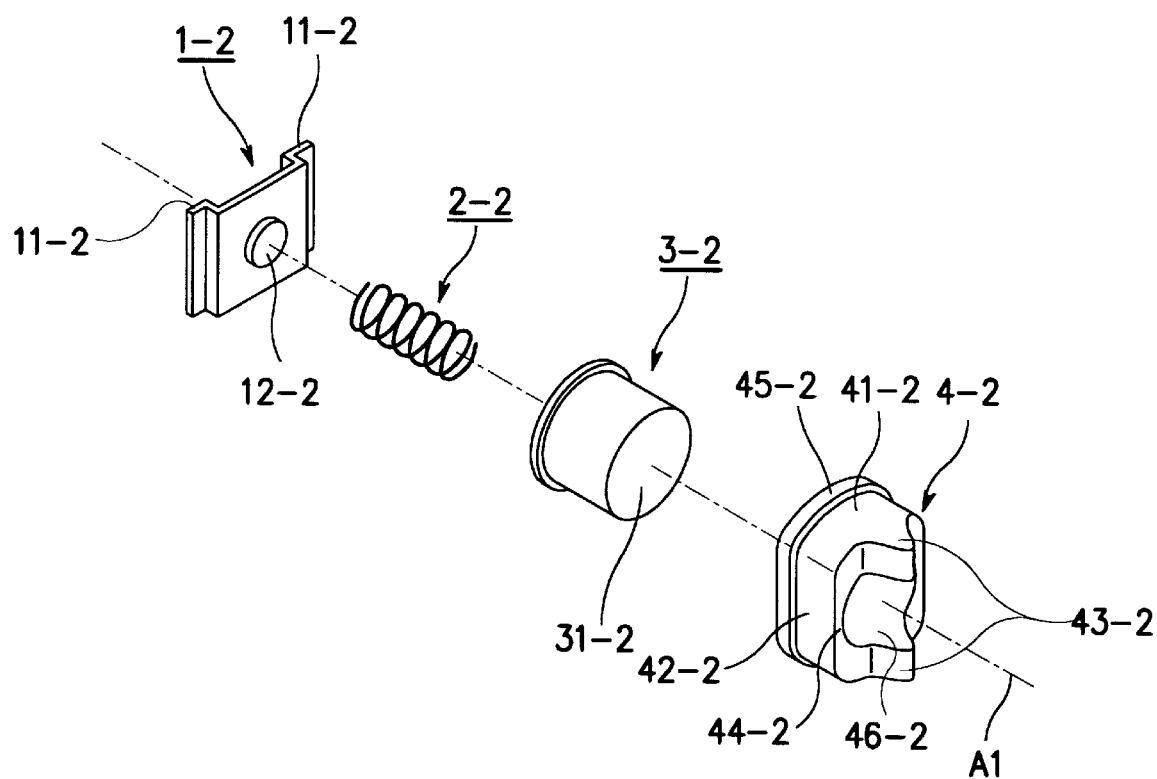
FIG. 14 is an assembly diagram of the hinge assembly according to the second embodiment of the present invention.
Figure 15:
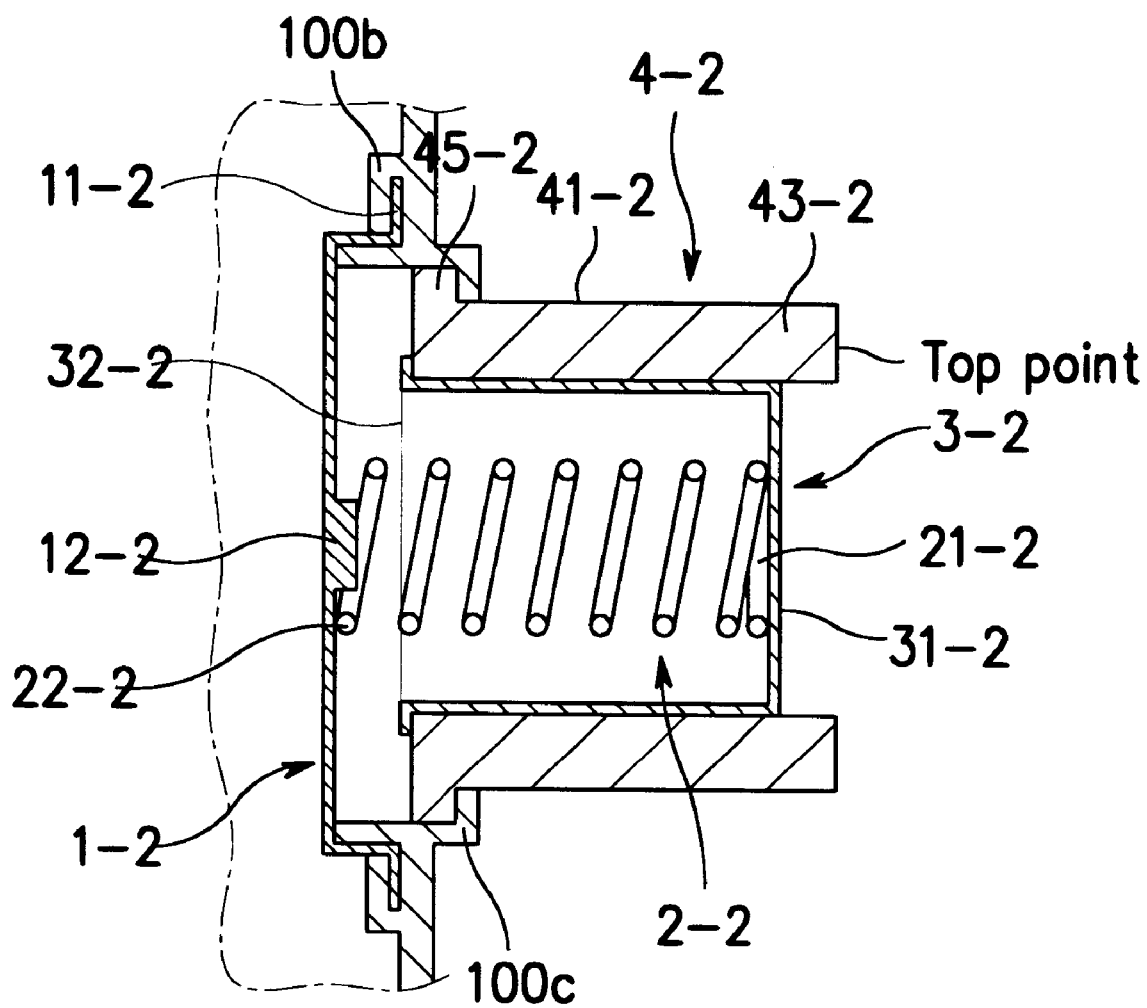
FIG. 15 is a cross-sectional view of the assembled hinge device according to the second embodiment of the present invention.

FIG. 14 is an assembly diagram of the hinge assembly H1, and FIG. 15 is a cross-sectional view of the assembled hinge assembly H1. Referring to FIG. 14, the hinge assembly H1 includes a contact plate 1-2, a hinge can 3-2, a coil spring 2—2 intervening between the contact plate 1-2 and the hinge can 3-2, for providing a restitution force, and a hollow hinge shaft 4-2 into which the hinge can 3-2 is pressed. The contact plate 1-2 has two free ends (or fixing ends) 11-2 to be fixed to a fixing rib 100b of the body 100, and a fixing protrusion 12-2 to which an end of the coil spring 2—2 is fixed. The hinge can 3-2 has a perfectly closed end 31-2 and a perfectly opened end 32-2 so that the coil spring 2—2 may be inserted into the hinge can 3-2. The hinge can 3-2 is conductive. The coil spring 2—2 has an end 21-2 in contact with the closed end 31-2 of the hinge can 3-2 and another end 32-2 in contact with the contact plate 1-2. The coil spring 2—2 provides the hinge can 3-2 with an elastic force. The elastic force of the coil spring 2—2 is delivered to the hinge shaft 4-2 through the hinge can 3-2. The coil spring 2—2 is elastic and conductive. The hollow hinge shaft 4-2 has a perfectly opened end 46-2 and securing means for preventing the hinge shaft 4-2 from rotating together with the flip cover 200 but allowing the hinge shaft 4-2 to move along an axis A1, when the flip cover 200 combined with the hinge shaft 4-2 is opened and closed. The securing means of the hinge shaft 4-2 is composed of a pair of opposite curved surfaces 41-2, a pair of opposite plane surfaces 42-2, and the recess 120 shown in FIG. 13. The hinge shaft 4-2 has a pair of opposite protrusions 43-2 formed at the curved surfaces 41-2 in a direction of the axis A1 and a pair of opposite indents 44-2 formed at the plane surfaces 42-2. Further, the hinge shaft 4-2 has a cylindrical inner wall so that the hinge can 3-2 may be pressed into the hinge shaft 4-2. In addition, the hinge shaft 4-2 has a protrusion 45-2 formed at another end thereof, for securing the hinge shaft 4-2 to a fixing rib 100c of the body 100.

The coupling members assembled in the hinge device have the same structure as illustrated in FIGS. 5A and 5B. Therefore, a description of the coupling member will not be given.

Figure 16A:
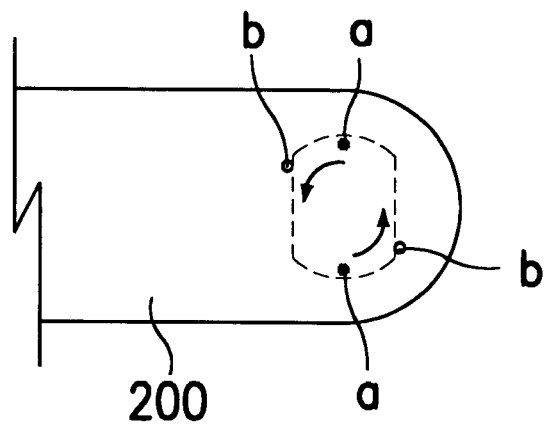
FIGS. 16A and 16B are views illustrating the states of the hinge device when the flip cover is closed.
Figure 16B:
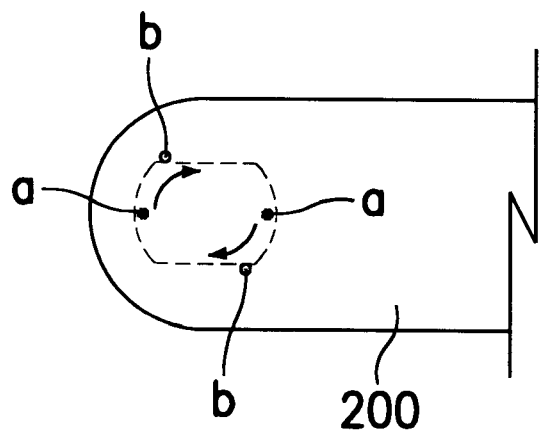
Figure 17A:
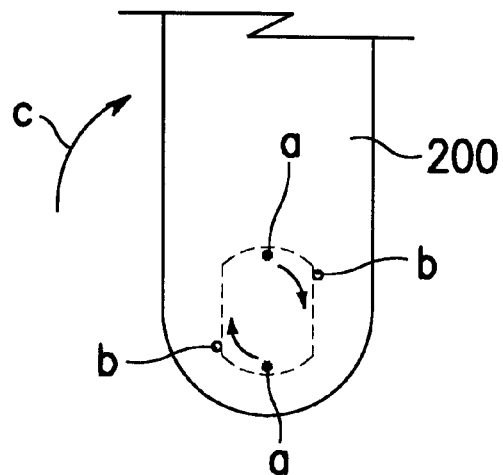
FIGS. 17A and 17B are views illustrating the states of the hinge device when the flip cover is opened approximately 90°.
Figure 17B:
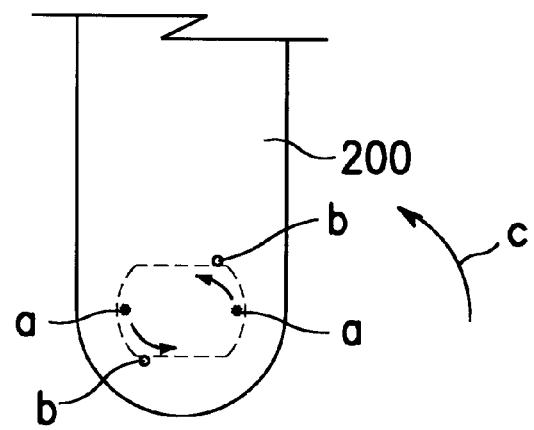
Figure 18A:
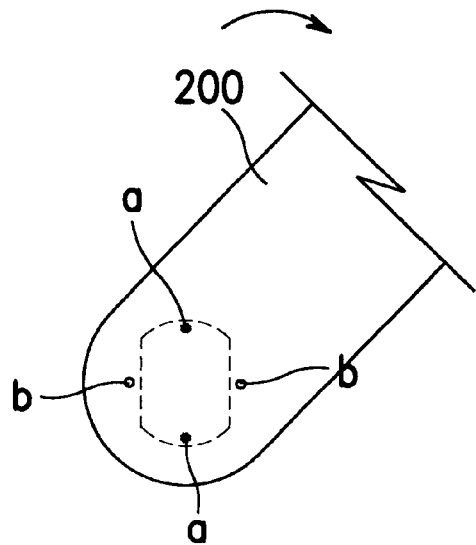
FIGS. 18A and 18B are views illustrating the states of the hinge device when the flip cover is opened to the opening angle.
Figure 18B:
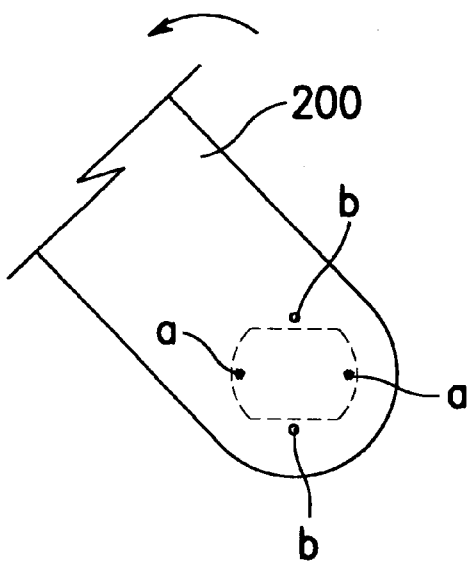

FIG. 16A illustrates a state of the coupling member 220 when the flip cover 200 is closed, and FIG. 16B illustrates a state of the coupling member 222 when the flip cover 200 is closed. FIG. 17A illustrates a state of the coupling member 220 when the flip cover 200 is opened by 90°, and FIG. 17B illustrates a state of the coupling member 222 when the flip cover 200 is opened by 90°. FIG. 18A illustrates a state of the coupling member 220 when the flip cover 200 is opened to the opening angle, and FIG. 18B illustrates a state of the coupling member 222 when the flip cover 200 is opened to the opening angle.

Among the figures, FIGS. 16A, 17A and 18A illustrate the operating states of the hinge device seen in the arrow direction A of FIG. 1, and FIGS. 16B, 17B and 18B illustrate the operating states of the hinge device seen in the arrow direction B of FIG.1. In FIGS. 16A to 18B, the points "a" denote the top points on the protrusions 43-2 of the hinge shaft 4-2, and points "b" denote the top points on the protrusions 2201 and 2221 formed in the slots 221 and 223 of the coupling members 220 and 222.

While the flip cover 200 is opened and closed with respect to the body 100, the protrusions 43-2 of the hinge shaft 4-2 slidingly contact the protrusions 2201 and 2221 of the coupling members 220 and 222. Operation of opening/closing the flip cover 200 will be described on the basis of the top points "a" on the protrusions 43-2 of the hinge shaft 4-2 and the top points "b" on the protrusions 2201 and 2221 of the coupling members 220 and 222 illustrated in FIGS. 5A, 5B, 14 and 15.

Referring to FIGS. 16A and 16B, when the mobile telephone is in the idle state (or on-hook state), the flip cover 200 is opened by 0°, i.e., closed to the body 100. In this on-hook state, the top points on the protrusions 43-2 of the hinge shaft 4-2 are positioned at the points "a" and the top points on the protrusions 2201 and 2221 of the coupling members 220 and 222 are positioned at the points "b". That is, the protrusions 43-2 of the hinge shaft 4-2 are firmly engaged with the indents 2202 and 2222 of the coupling members 220 and 222. As stated above, the hinge shaft 4-2 has a restitution force by means of the coil spring 2—2 inserted into the hinge can 3-2, and this restitution force maintains the close surface contact between the protrusions 2201 and 2221 of the coupling members 220 and 222 and the indents 44-2 of the hinge shaft 4-2. Here, the flip cover 200 is forced in the arrow direction by the restitution force of the coil spring 2—2 so that the flip cover 200 may be tightly closed to the body 100. Accordingly, the flip cover 200 may not be opened by itself, unless the user forcedly opens it.

Referring to FIGS. 17A and 17B, when the flip cover 200 is opened by 90° in an arrow direction C, the points "b" pass over the top points "a" on the protrusions 43-2 of the hinge shaft 4-2, maintaining the sliding surface contact with the protrusions 43-2 of the hinge shaft 4-2, to reach the positions shown in FIGS. 17A and 17B. Accordingly, the flip cover 200 is forced in the arrow direction, which forces the flip cover 200 to be opened to the opening angle. In this state, the protrusions 43-2 of the hinge shaft 4-2 maintain the surface contact with the protrusions 2201 and 2221 of the coupling members 220 and 222, by means of the coil spring 2—2.

Referring to FIGS. 18A and 18B, when the flip cover 200 is opened by about 130–140° (of the opening angle), the mobile telephone is in the off-hook state where the user can have a telephone conversation. In that state, the indents 2202 and 2222 of the coupling members 220 and 222 contact the protrusions 43-2 of the hinge shaft 4-2, and the protrusions 2201 and 2221 of the coupling members 220 and 222 contact the indents 44-2 of the hinge shaft 4-2. That is, the hinge shafts 4-2 are firmly engaged with the coupling members 220 and 222 of the flip cover 200. In this circumstance, a virtual line drawn between the top points "b" on the protrusions 2201 and 2221 of the coupling members 220 and 222 is perpendicular to a virtual line drawn between the top points "a" on the protrusions 43-2 of the hinge shaft 4-2, thus maintaining the opening angle.

Figure 19:
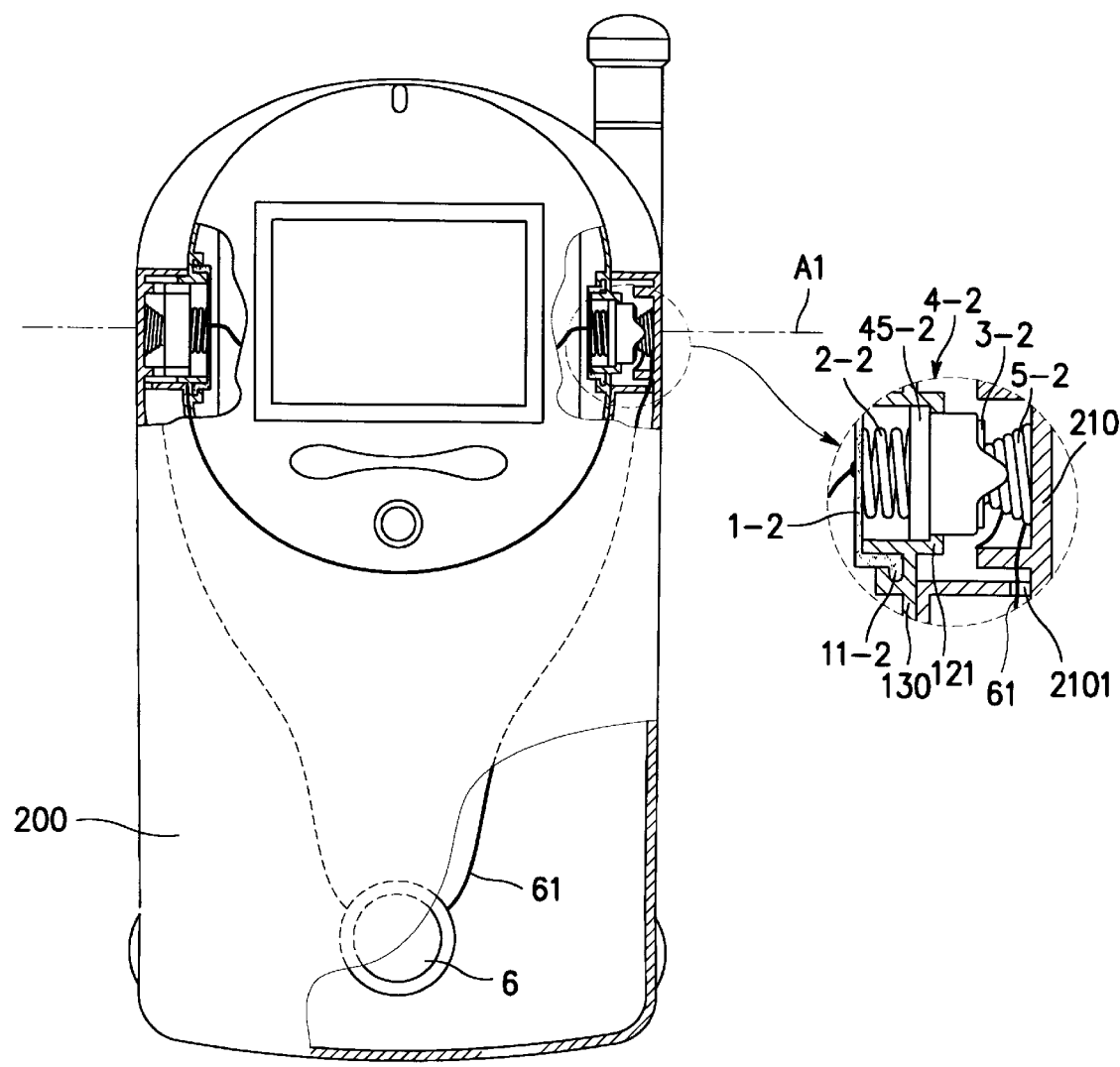
FIG. 19 is a partial cross-sectional view illustrating how to electrically connect a speaker mounted on the flip cover to the body.
Figure 20:
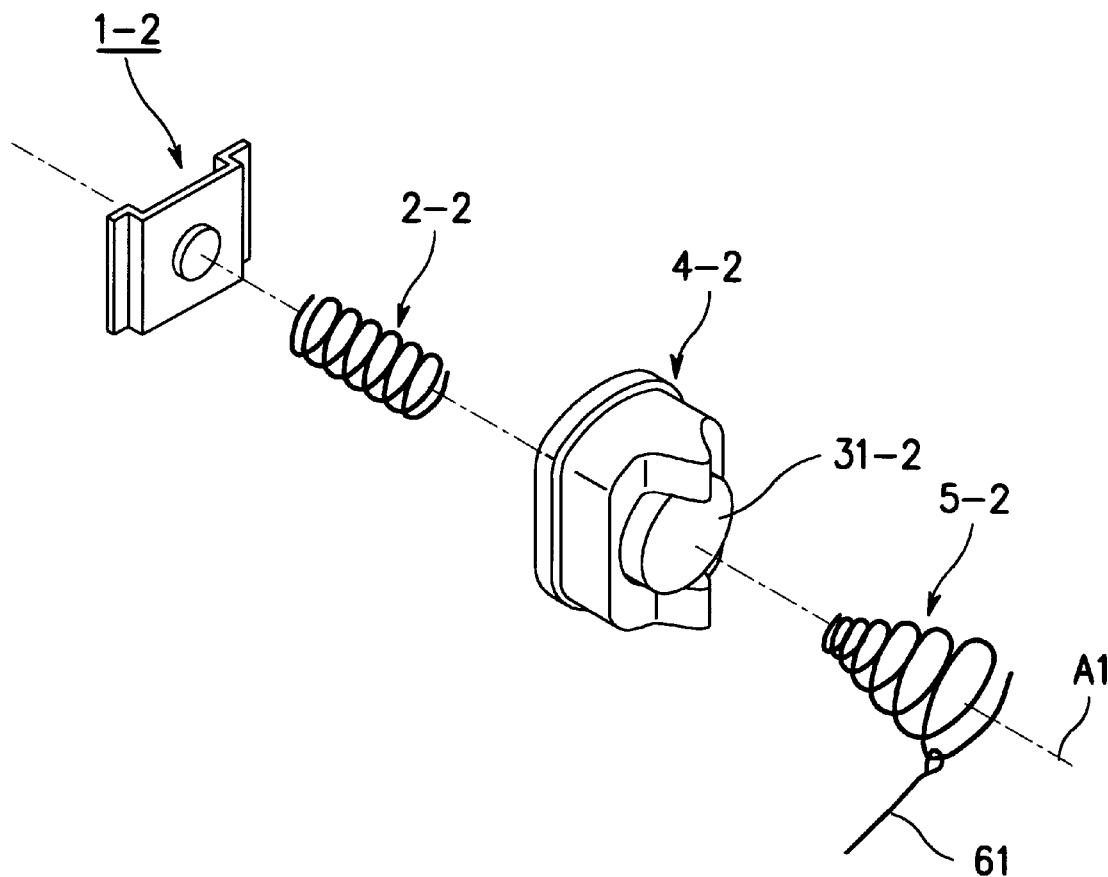
FIG. 20 is an assembly diagram of conducting means for the hinge device according to the second embodiment of the present invention.

FIG. 19 is a partial cross-sectional view illustrating how to electrically connect the speaker 6 mounted on the flip cover 200 to the body 100, and FIG. 20 is an assembly diagram illustrating how to assemble the hinge assembly H1.

Now, reference will be made to the conducting means of the hinge device. The conducting means according to the present invention electrically connects the speaker 6 mounted on the flip cover 200 to the PCB of the body 100. The conducting mean is composed of the contact plate 1-2, the conductive coil spring 2—2 in contact with the contact plate 1-2, the conductive hinge can 3-2 in contact with the coil spring 2—2, and a conductive coil spring 5-2 in contact with the hinge can 3-2.

Referring to FIG. 20, the contact plate 1-2 is fixed to the fixing rib 100c formed at the body 100, by inserting it downward. The contact plate 1-2 is then electrically connected to the PCB by using an electric wire. The coil spring 2—2 intervenes between the contact plate 1-2 and the hinge can 3-2, providing the restitution force. Preferably, either end of the spiral coil spring 5-2 should have different diameter. Here, an end of the coil spring 5-2, having a small diameter, contacts the closed end 31-2 of the hinge can 3-2 and another end of the coil spring 5-2, having a large diameter, contacts the bottom of the slot 221.

As a result thereof, the wire 61 coming out from the speaker 6 is connected to the coil spring 5-2 by way of the opening 2101 formed at the neck 210, and the coil spring 5-2 is then connected to the PCB of the body 100 by way of the hinge can 3-2 and the contact plate 1-2.

As can be appreciated from the foregoing descriptions, the novel hinge device has the conducting means so that it is possible to mount the speaker on the flip cover, thereby contributing to miniaturization of the mobile telephone. In addition, the hinge device is detachable from the body so that the flip cover is also detachable from the body.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A hinge device of a mobile type telephone with conducting means including a body and a flip cover with a speaker mounted thereon, comprising:
    at least two independent hinge assemblies for mechanically connecting said body to said flip cover including:
    a spring connector pin laid along a rotation axis;
    a hinge shaft having at least one perfectly opened end, a pair of opposite protrusions, a pair of opposite indents, and a cylindrical inner wall into which the spring connector pin is pressed, a pair of opposite curved surfaces and a pair of opposite plane surfaces, said shaft being movable along said rotation axis;
    a hinge housing having a perfectly opened end and a partially opened end at the center of the axis, a pair of opposite curved surfaces and a pair of opposite plane surfaces into which the hinge shaft is inserted;
    guide means for enabling the hinge shaft to move rectilinearly in the hinge housing; and
    securing means for preventing separation of the hinge shaft from the hinge housing.

2. The hinge device as claimed in claim 1, wherein said device further comprises a coupling member formed at an end of the flip cover, having a pair of opposite protrusions and a pair of opposite indents, for keeping in sliding surface contact with the hinge assembly when the flip cover is opened and closed.

3. The hinge device as claimed in claim 1, wherein said device further comprises first conducting means interposed between the hinge assembly and the coupling member, for electrically connecting the speaker to a printed circuit board housed within the body.

4. The hinge device as claimed in claim 2, wherein said device further comprises first conducting means interposed between the hinge assembly and the coupling member, for electrically connecting the speaker to a printed circuit board housed within the body.

5. The hinge device as claimed in claim 1, wherein said spring connector pin comprises:
    a first hinge can;
    a second hinge can secured to the first hinge can; and
    a coil spring interposed between the first and second hinge cans, for providing a restitution force.

6. The hinge device as claimed in claim 5, wherein said second hinge can comprises at least one fixing projection.

7. The hinge device as claimed in claim 5, wherein the first and second hinge cans each have a perfectly closed end and a perfectly opened end.

8. The hinge device as claimed in claim 1, wherein said securing means comprises:
    grooves formed at the indents of the hinge shaft; and
    protrusions formed at the end of the hinge housing, to be inserted into the grooves when the hinge shaft is pressed into the hinge housing.

9. The hinge device as claimed in claim 1, wherein said first conducting means comprises:
    a conductive hinge can;
    a second conductive hinge can secured to the first hinge can;
    a conductive coil spring interposed between the first and second hinge can; and
    second conducting means installed at the bottom of the coupling member to be always in contact with the first hinge can.

10. The hinge device as claimed in claim 9, wherein said second conducting member is a contact plate having a convex formed at a central portion thereof.

11. The hinge device as claimed in claim 9, wherein said second conducting member is a conductive coil spring having both ends of different diameters.

12. A hinge device of a mobile telephone with conducting means including a body and a flip cover with a speaker mounted thereon, comprising:
    at least two independent hinge assemblies for mechanically connecting the body to the flip cover including:
    a contact plate having at least one fixing end and a fixing protrusion;
    a coil spring, one end of which is in contact with the contact plate;
    a hinge can in contact with another end of the coil spring, which is inserted in the hinge can;
    a hinge shaft having at least one perfectly opened end, a pair of opposite protrusions, a pair of opposite indents, and a cylindrical inner wall into which the hinge can is pressed, a pair of opposite curved surfaces and a pair of opposite plane surfaces, said shaft being movable along a rotation axis;
    guide means for guiding rectilinear movement of the hinge shaft; and
    securing means for preventing separation of the hinge shaft from the body.

13. The hinge device as claimed in claim 12, wherein said device comprises a coupling member formed at the end of the flip cover, having a pair of opposite protrusions and a pair of opposite indents, for keeping in sliding surface contact with the hinge assembly when the flip cover is opened and closed.

14. The hinge device as claimed in claim 11, wherein said device further comprises first conducting means interposed between the hinge assembly and the coupling member, for electrically connecting the speaker to a printed circuit board housed within the body.

15. The hinge device as claimed in claim 12, wherein said device further comprises first conducting means interposed between the hinge assembly and the coupling member, for electrically connecting the speaker to a printed circuit board housed within the body.

16. The hinge device as claimed in claim 12, wherein said hinge can comprises a perfectly closed end and a perfectly opened end.

17. The hinge device as claimed in claim 12, wherein said first conducting means comprises:
   a conductive contact plate;
   a conductive coil spring one end of which is in contact with the contact plate;
   a conductive hinge being in contact with another end of the coil spring; and
   second conducting means installed at the coupling member to be always in contact with the hinge can.

18. The hinge device as claimed in claim 17, wherein said second conducting means is a conductive coil spring having both ends of different diameters.

19. A hinge device of a mobile type telephone including a body and a flip cover with a speaker mounted thereon, comprising:

at least two independent hinge assemblies for mechanically connecting said body to said flip cover including:
   a spring connector pin laid along a rotation axis;
   a hinge shaft having at least one opened end, a pair of opposite protrusions, a pair of opposite indents, and a cylindrical inner wall into which the spring connector pin is pressed, a pair of opposite curved surfaces and a pair of opposite plane surfaces, said shaft being movable along said rotation axis;
   a hinge housing having a perfectly opened end and a partially opened end at the center of the axis, a pair of opposite curved surfaces and a pair of opposite plane surfaces into which the hinge shaft is inserted;
   guide means for enabling the hinge shaft to move rectilinearly in the hinge housing;
   securing means for preventing separation of the hinge shaft from the hinge housing;
   a coupling member maintained in sliding surface contact with the hinge assembly when the flip cover is opened and closed; and
   a conducting means for electrically connecting a speaker mounted on the flip cover to the body of the mobile telephone, which is interposed between the hinge assembly and the coupling means.

\* \* \* \* \*